United States Patent [19]
Mastalski et al.

[11] Patent Number: 5,443,785
[45] Date of Patent: Aug. 22, 1995

[54] METHOD OF TREATING SEAMLESS BELT SUBSTRATES AND CARRIERS THEREFOR

[75] Inventors: Henry T. Mastalski, Webster; Clifford H. Griffiths, Pittsford, both of N.Y.

[73] Assignee: Xerox Corporation, Stamford, Conn.

[21] Appl. No.: 176,380

[22] Filed: Jan. 3, 1994

[51] Int. Cl.⁶ ............................................. B23P 11/02
[52] U.S. Cl. .................. 264/573; 29/421.1; 29/450; 427/74; 430/127
[58] Field of Search ............... 264/510, 570, 573; 29/421.1, 424, 450; 425/111, 112, 129.1, 393, 501, 503; 427/74; 430/127

[56] References Cited

U.S. PATENT DOCUMENTS

| | | | |
|---|---|---|---|
| 1,322,843 | 11/1919 | Townsend | 29/235 |
| 1,457,781 | 6/1923 | Loughead | 29/421.1 |
| 2,645,004 | 7/1953 | Dorner | 29/450 |
| 2,721,601 | 10/1955 | Spencer | 29/450 |
| 2,782,459 | 2/1957 | Mancrieff | 264/510 |
| 2,980,474 | 4/1961 | Gargar | 29/421.1 |
| 2,988,387 | 6/1961 | Eschmann et al. | 29/421.1 |
| 3,146,709 | 9/1964 | Bass et al. | 29/450 |
| 3,647,589 | 3/1972 | Felder | 156/165 |
| 3,695,757 | 10/1972 | Gregory . | |
| 3,846,901 | 11/1974 | Lovett | 29/450 |
| 3,900,941 | 8/1975 | Browning et al. | 29/450 |
| 4,332,073 | 6/1982 | Yoshida et al. | 29/421.1 |
| 4,378,622 | 4/1983 | Pinkston et al. | 29/450 |
| 4,599,783 | 7/1986 | Ceccacci | 29/421.1 |
| 4,711,833 | 12/1987 | McAneney et al. . | |
| 4,747,992 | 5/1988 | Sypula et al. . | |
| 5,039,598 | 8/1991 | Abramsohn et al. . | |
| 5,073,434 | 12/1991 | Frank et al. . | |
| 5,100,628 | 3/1992 | Griffiths et al. . | |
| 5,143,573 | 9/1992 | Ammon et al. . | |
| 5,167,987 | 12/1992 | Yu . | |

FOREIGN PATENT DOCUMENTS

| | | |
|---|---|---|
| 0003051 | 7/1979 | European Pat. Off. . |
| 0246627 | 11/1987 | European Pat. Off. . |
| 0406172 | 1/1991 | European Pat. Off. . |
| 2949164 | 6/1980 | Germany . |
| 3-144458 | 1/1991 | Japan . |

OTHER PUBLICATIONS

H. T. Mastalski, "Continuous Horizontal Coating System", Xerox Disclosure Journal, vol. 17, No. 2, Mar.-/Apr. 1992.

*Primary Examiner*—Catherine Timm
*Attorney, Agent, or Firm*—Oliff & Berridge

[57] ABSTRACT

A seamless substrate is elastically stretched over a hollow cylindrical porous mandrel having a thermal expansion coefficient not greater than the thermal expansion coefficient of the substrate by applying fluid under pressure through the mandrel and relieving the pressure of the fluid so that the substrate relapses to a shape in close contact with the mandrel. A substrate carrier includes a hollow, substantially cylindrical mandrel formed of a porous material, the mandrel having an outer diameter not greater than the inner diameter of the tubular substrate and means for supplying a pressurized fluid to the interior of the mandrel, wherein the porous material is a material having a thermal expansion coefficient not greater than the thermal expansion coefficient of the substrate.

11 Claims, 6 Drawing Sheets

METHOD OF TREATING SEAMLESS BELT SUBSTRATES AND CARRIERS THEREFOR

BACKGROUND OF THE INVENTION

This invention relates in general to electrostatography and, in particular, to a process for fabricating electrostatographic imaging members.

In electrostatography, an electrophotographic imaging member is imaged by first uniformly electrostatically charging its surface. The photosensitive imaging member is then exposed to a pattern of activating electromagnetic radiation such as light. The radiation selectively dissipates the charge in the illuminated areas of the photoconductive insulating layer, while leaving behind an electrostatic latent image in the non-illuminated areas. The electrostatic latent image is then developed to form a visible image by depositing finely divided electroscopic marking particles on the surface of the photoconductive insulating layer. The resulting visible image is transferred from the imaging member directly or indirectly to a support such as paper. This imaging process can be repeated many times with reusable imaging members.

The electrophotographic imaging member may be a plate, drum, belt or the like containing the photoconductive insulating layer on a conductive layer. This invention relates to a process for fabrication of substrates which are useful as photoreceptor belts for use in electrostatography.

Flexible organic photoreceptors in the form of belts are manufactured by coating a web and thereafter shearing the web into segments and forming the segments into belts by welding opposite ends. Since the resulting welded seam on the photoreceptor disrupts the continuity of the outer surface of the photoreceptor, the seam must be indexed so that it does not print out during imaging cycles. However, efficient stream feeding of paper and throughput are adversely affected because it is necessary to detect where the seam is located within the length of each sheet of paper. The mechanical and optical devices required for indexing add to the complexity and cost of equipment and reduce the available design flexibility. Welded belts are also less desirable for electrophotographic imaging systems because the seam forms a weak point in the belt and then collects toner debris during cleaning, particularly with wiper blade cleaning devices.

U.S. Pat. No. 4,711,833, to McAneney et al., Dec. 8, 1987, relates to a process for fabrication of a seamless belt. The process comprises providing a mandrel coated with a release coating, depositing a polymer by electrostatic spraying, melting the polymer and cooling the polymer. The resulting seamless belt is removed from the mandrel prior to or after application of a ground plane layer, photogenerating layer and charge generating layer. After formation of the coated or uncoated belt, air pressure is applied to the interior of the mandrel. The air passes through holes at one end of the mandrel to lift and break the adhesive bond between the inside surface of the seamless coated or uncoated belt and the surface. The air pressure is then released and the seamless coated or uncoated belt is slipped off the mandrel.

U.S. Pat. No. 4,747,992, to Sypula et al., May 31, 1988, relates to a process for forming a seamless belt comprising forming at least one thin uniform fluid coating of a film-forming polymer on a cylindrical mandrel having a larger mass, a lower thermal conductivity, or both a larger mass and a lower thermal conductivity than the film-forming polymer. The mandrel further has a critical surface tension greater than the surface tension of the fluid coating. The mandrel is coated and then both the mandrel and the coating are heated to a temperature above the apparent $T_g$ of the coating to expand the coating and mandrel. The coating is cooled below the apparent $T_g$ of the solid coating. The mandrel is then cooled whereby the mandrel contracts at a greater rate than the coating to effect separation between the mandrel and the coating. Fluid air or liquid may be introduced at one or both ends of the mandrel between the mandrel surface and the positive belt to reduce adhesion between the mandrel and the coating to facilitate removing the coating from the mandrel.

U.S. Pat. No. 5,100,628, to Griffiths et al., Mar. 21, 1992, teaches a method and apparatus for coating photoreceptors. Prior to coating, an elastically deformable material is placed around the external surface of an mandrel to accommodate a belt. The thickness of the mandrel is such that when the belt is placed, the deformable material is deformed and engages the interior surfaces of the belt facing the mandrel. As a result of heating and cooling during the coating process, the belt contracts and expands at a different rate than the mandrel. After coating, the coated belt is removed.

U.S. Pat. No. 5,167,987, to Yu, Dec. 1, 1992, relates to a process for fabricating an electrostatographic imaging member wherein a flexible substrate of a solid thermoplastic polymer is provided. An imaging layer coating including a film forming polymer is formed on the substrate. The coating and substrate are heated, then cooled. Sufficient predetermined biaxial tension is applied to the substrate while the energy layer coating and substrate are at a temperature greater than the glass transition temperature of the imaging layer coating. Application of the biaxial tension substantially compensates for all dimensional thermal contraction mismatches between the substrate and the imaging layer during cooling.

Japanese Laid-Open Patent Application No. 3-144458, Jun. 19, 1991, discloses a method of removing a coated membrane at the end of a drum wherein a laser beam is used to irradiate the membrane at a wavelength capable of burning and sublimating a coating formed on the outer circumferential surface of the drum. A suctioning device is disposed at the lower end of the drum to aid in removing the membrane from the drum surface.

Xerox Disclosure Journal, Vol. 17, No. 2, March/April, 1992, pages 95-96, discloses a continuous horizontal coating system for the manufacture of organic and alloy coated photoreceptors. The system includes various stations arranged in succession. The stations provide for operations such as material handling, vacuum and/or spray deposition, substrate drying and load/unload steps. The system provides for transporting a workpiece along a guide path via a linear motion system. The linear motion system may include an air film suspension/rotation/axial displacement system.

U.S. patent application Ser. No. 08/176,973, to Mastalski, now U.S. Pat. No. 5,413,810 filed on the same day as the present application, discloses a method of fabricating electrostatographic imaging members. An endless substrate is elastically stretched over a hollow cylindrical elongated support mandrel. The mandrel is formed of a porous material. Fluid is applied under pressure through the mandrel to form a layer of fluid between the outer surface of the mandrel and the inner surface of the substrate. The flow of fluid is manipulated to axially displace and to rotate the substrate on the outer surface of the mandrel. The flow of fluid is manipulated to orient a selected portion of the surface of the substrate to an angle to a direction of application of a coating. The temperature of fluid is manipulated to assist in substrate temperature control at steps of the coating and drying process.

The invention provides a method for processing a belt to produce a seamless belt with a uniform thermal history throughout. The invention also provides a method for obtaining photoconductive belt imaging members having uniform thermal history and uniform electrophotographic properties. The invention facilitates mounting and removal of the belt on a mandrel. The invention further provides a method for obtaining a photoconductive belt imaging member in which mounting of the belt on the carrier and removal therefrom is facilitated. The invention additionally provides a carrier for maintaining uniformly close thermal contact with the belt or photoconductive imaging member during its processing.

SUMMARY OF THE INVENTION

The invention provides a process for treating a seamless substrate, comprising elastically stretching the substrate over a hollow cylindrical porous mandrel having a thermal expansion coefficient not greater than the thermal expansion coefficient of the substrate by applying fluid under pressure through the mandrel, and relieving the pressure of the fluid so that the substrate relapses to a shape in close contact with the mandrel.

The invention also provides a substrate carrier for use in a system for processing a flexible tubular substrate, comprising a hollow, substantially cylindrical mandrel formed of a porous material, the mandrel having an outer diameter not greater than the inner diameter of the tubular substrate and means for supplying a pressurized fluid to the interior of the mandrel, wherein the porous material comprises a material having a thermal expansion coefficient not greater than the thermal expansion coefficient of the substrate.

DETAILED DESCRIPTION OF THE INVENTION

The invention is a process for treating a seamless substrate by elastically stretching the substrate over a hollow cylindrical porous mandrel. The mandrel has a thermal expansion coefficient not greater than the thermal expansion coefficient of the substrate. The seamless substrate is stretched by applying fluid under pressure through the mandrel against the inner surface of the substrate. The substrate is stretched, positioned over the mandrel and the pressure of the fluid against the substrate is relieved so that the substrate relapses to a shape in close contact with the mandrel. The stretching step can comprise sequentially forcing pressurized fluid though selected portions of the mandrel against the inner surface of the seamless substrate.

After mounting, the substrate can then be treated in accord with the imaging member fabricating process disclosed in copending U.S. patent application Ser. No. 08/176,973, to Mastalski identified above. After processing, the imaging member can be removed from the mandrel by restretching the substrate by applying fluid or expanding the substrate by applying fluid and heat. The fluid can be air, oxygen or nitrogen or any other suitable fluid for stretching the seamless belt. The fluid can be sequentially forced under pressure through selected portions of the mandrel to control the substrate stretching or relapsing step. The temperature of the fluid can be manipulated to control the temperature of the substrate during the mounting, processing of the substrate or subsequent removal step from the mandrel.

Additionally, the invention is a substrate carrier that allows easy mounting and demounting of a flexible belt, maintains uniform thermal contact and allows dimensional control of the substrate during processing. The carrier comprises a porous mandrel with an outside diameter substantially the same as the size of the inside diameter required for the finished photoreceptor belt. This mandrel operates on the air bearing principle. A tightly fitting belt on the mandrel can be easily removed by forcing compressed air through the pores to float the belt on a very thin cushion of air, stretching the substrate within its elastic limit.

The flexible tubular substrates used to form an imaging belt preferably have dimensions in the range of 5–15 inches in diameter (127–381 mm) by 10–15 inches wide (254–381 mm), by 1–10 mil thick (25–250 mm). The flexible substrates for use with the present invention include flexible polymer belts as well as flexible metal foil belts including nickel foil belts.

Mounting the substrate on the porous mandrel is preferably accomplished by using a slightly tapered porous collar with a maximum diameter the same as that of the mandrel. The degree of taper is preferably around 10°. Forcing compressed air through the pores of the collar allows the substrate to expand to fit over the mandrel.

Alternatively, a belt whose inner diameter is slightly larger than the outer diameter of the mandrel can be used. In this instance, substrate properties can be selected or controlled to permit the substrate to relapse to form a tight fit on the mandrel.

Removing the substrate from the porous mandrel according to the invention is accomplished by forcing compressed air through the porous mandrel to expand and float the substrate on a thin cushion of air, thereby facilitating its removal from the mandrel.

Mounting techniques of the invention result in close thermal contact being maintained between the substrate and the mandrel both during and in between repeated spray coating and oven drying cycles. Spray coating, such as solvent spray coating, is a preferred coating technique for applying photoreceptor layers to the substrate.

Because of effects on the substrate and mandrel when temperature is reduced to below the substrate glass transition temperature, the thermal expansion coefficient of the substrate must be the same as, or greater than the thermal expansion coefficient of the mandrel. If this is the case, no detrimental shrinkage will occur. However, if the thermal expansion coefficient of the mandrel is larger than that of the substrate, the mandrel can become smaller than the belt, and poor thermal contact will result. Poor thermal contact can be avoided by assuring a secure fit of the substrate to the mandrel by proper selection of materials.

Porous mandrels are formed by various techniques, including sintering, drilling, laser perforating, water jet cutting and the like. Preferably, the mandrel is a porous metallic tube fabricated by partially fusing a metal powder. Preferably the metal is nickel. The size, quantity, and density of pore holes varies depending on how the porous mandrel is formed.

As the substrate is mounted or removed from the mandrel, the number and location of covered pores changes. This changes the total pressure drop across the pores, which changes the flow rate of air through covered pores and changes the pressure on the belt. As the flow rate changes, the ability of the fluid to act as a bearing and to float the belt changes. Likewise, as the pressure on the substrate changes, the ability of the fluid to stretch the substrate changes.

The size, quantity of holes, operating air pressure and flow are all inter-related and are unique to various substrate sizes. Segmented pressure/flow "zones", staged pressure/flow application and graduated pore sizes are all known techniques to manage fluid pressures and to achieve the performance required.

Laser drilled pores may vary in size from 0.001 to 0.01 inches in diameter. Laser drilled pores may be staggered by 0.2 to 0.9 inches, preferably from 0.375 to 0.75 inches. Preferably fluid pressure ranges vary from 2 to 40 PSI.

Figure 1A:
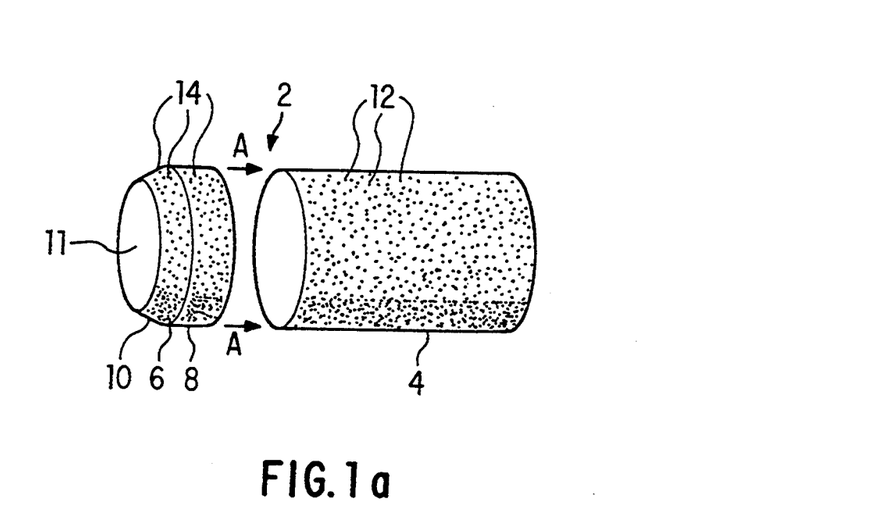
FIGS. 1(a) to 1(b) are schematic illustrations of the assembly of the carrier and the manner of mounting the substrate on the carrier.

FIG. 1(a) shows, in schematic form, the assembly of the mandrel according to a preferred embodiment of the invention. The mandrel 2 comprises a cylindrical section 4 and a collar section 6. The collar section 6 has a portion 8 of uniform circular cross-section and a conically tapered portion 10 terminating in an impermeable face plate 11. The outer diameter of the portion 8 is the same as that of the cylindrical section 4. A number of pores 12, 14 extend through the side walls of both the cylindrical section 4 and the collar section 6. The collar section 6 is joined to the cylindrical section 4 by moving the collar section 6 in the direction of arrows A and subsequently fixing the two sections together as described below.

Figure 1B:
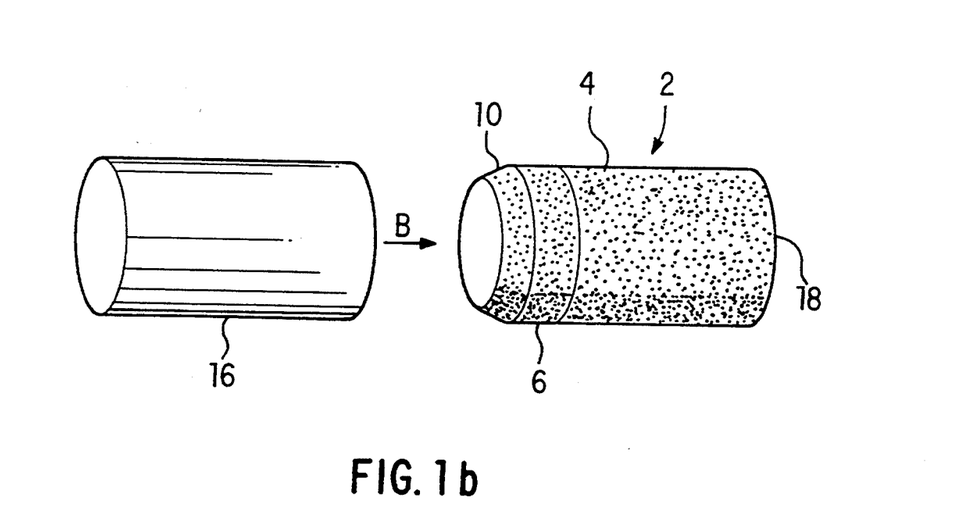

Referring to FIG. 1(b), once the collar section 6 and cylindrical section 4 are attached, the substrate 16 is mounted on the mandrel 2 by moving the substrate 16 in the direction of arrow B to slip the substrate 16 over the end of the mandrel 2 while air is forced under pressure through the pores 12, 14 from an end 18 of the cylindrical section 4, opposite the collar section 6.

Figure 2:
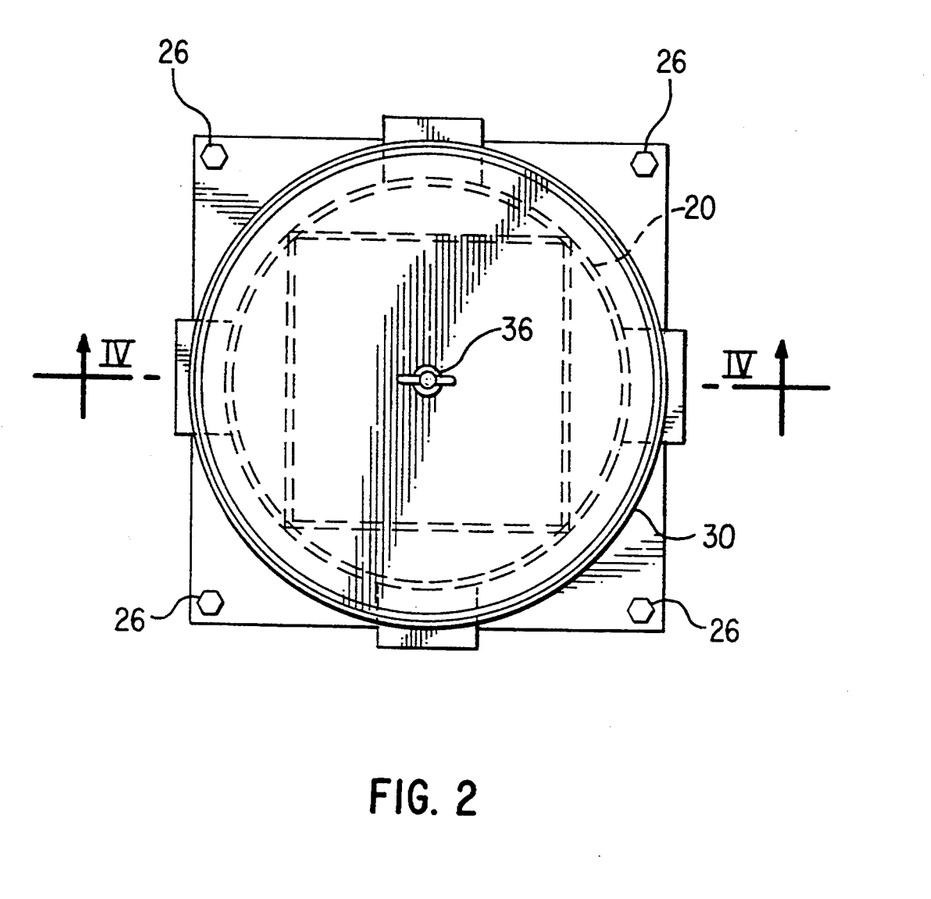
FIG. 2 is plan view of a carrier according to an embodiment of the invention.
Figure 3:
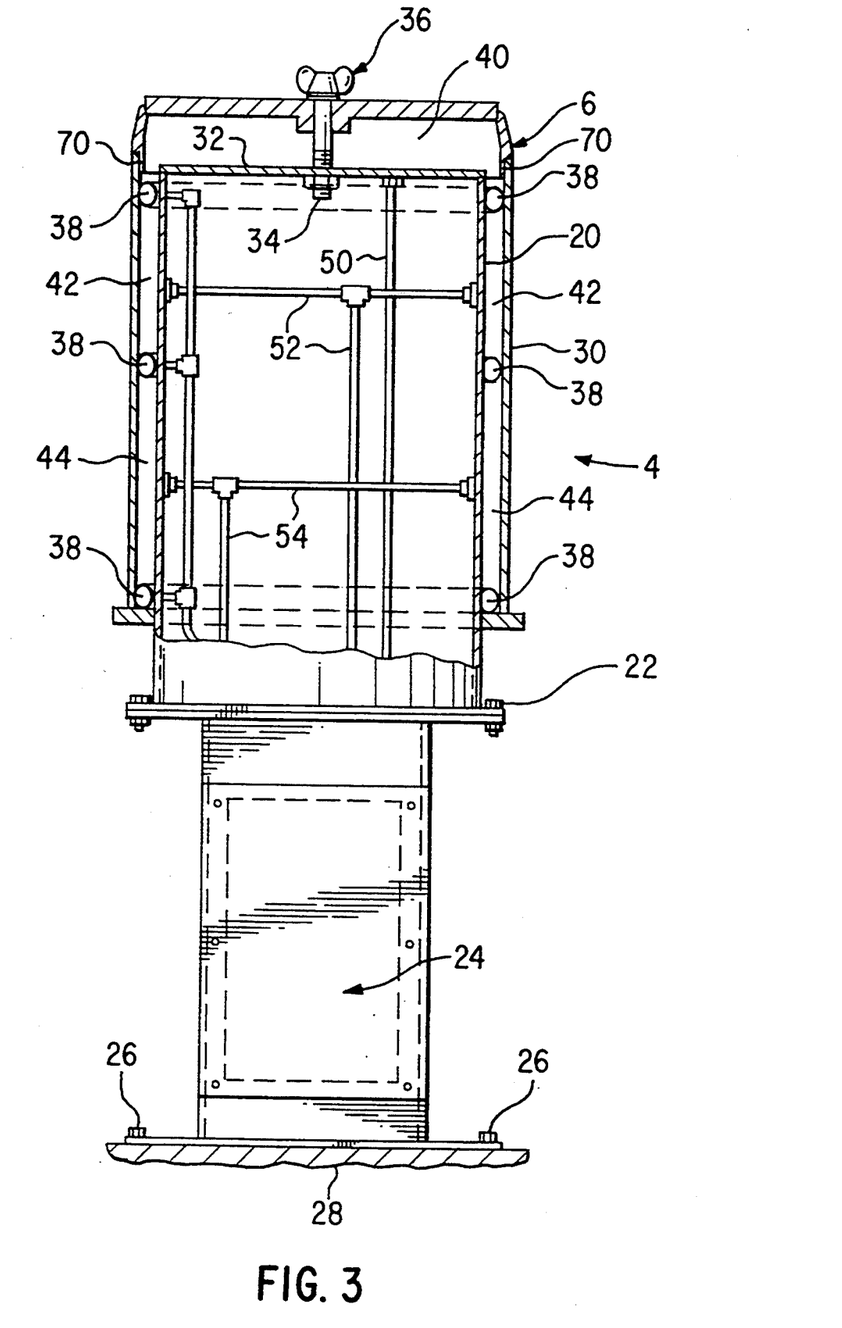
FIG. 3 is a cross-sectional view of FIG. 2 through line IV—IV.

A mandrel according to a preferred embodiment of the invention is shown in greater detail in FIGS. 2 and 3. As shown particularly in FIG. 3, the cylindrical section 4 has an inner cylinder 20 fixedly attached at one end by bolts 22 to a compressed air supply 24 and an outer cylinder 30. Outer cylinder 30 can function as a removable carrier supporting the substrate. The pores 12 are formed on the outer cylinder 30. The air supply 24 is fixedly attached by bolts 26 to a base 28. Opposing end of the inner cylinder 20 is sealed by an impermeable face plate 32. The collar section 6 is attached to the cylindrical section 4 by means of a bolt 34, which engages the internal surface of the face plate 32, and nut 36. A plurality of expandable rubber inflatable seals 38 are fixed to the outer surface of the inner cylinder 20. The seals 38 divide the space between the inner cylinder 20 and the outer cylinder 30 into an end space 40 and upper and lower annular spaces 42 and 44 respectively.

Each space 40, 42, 44 is connected to compressed air supply 24, respectively, by pipes 50, 52, 54 disposed inside the inner cylinder 20. The spaces 40, 42, 44 are thus selectively supplied with compressed air. In this way, when a substrate 16 is mounted on the mandrel 2, compressed air is sequentially forced out through the pores 12, 14 in the walls of the mandrel 2 (i.e. outer cylinder 30), initially from the end space 40, then from spaces 40 and 42, and finally from all three spaces. This ensures that air is forced out through pores in sections of the mandrel 2, which are already at least partially covered by the substrate as it is mounted. This ensures that sufficient air flow and pressure are maintained in the covered areas of the mandrel 2. Likewise, during removal of the substrate 16, the air supply to the spaces 40, 42, 44 is sequentially cut off as the corresponding sections of the outer surface of the cylinder 30 are uncovered.

Figure 4:
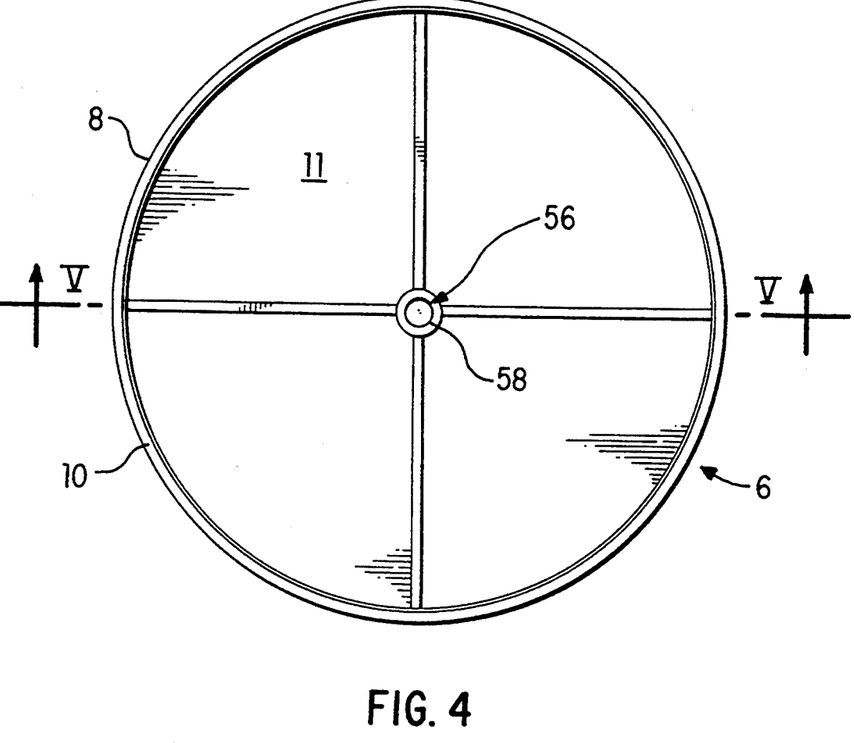
FIG. 4 is a plan view of the collar section of the carrier according to an embodiment of the present invention.
Figure 5:
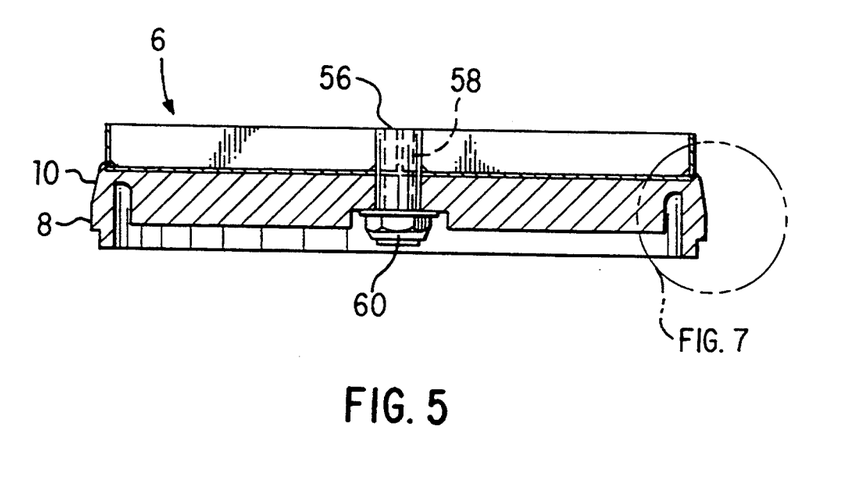
FIG. 5 is a cross-sectional view of FIG. 4 through line V—V.
Figure 6:
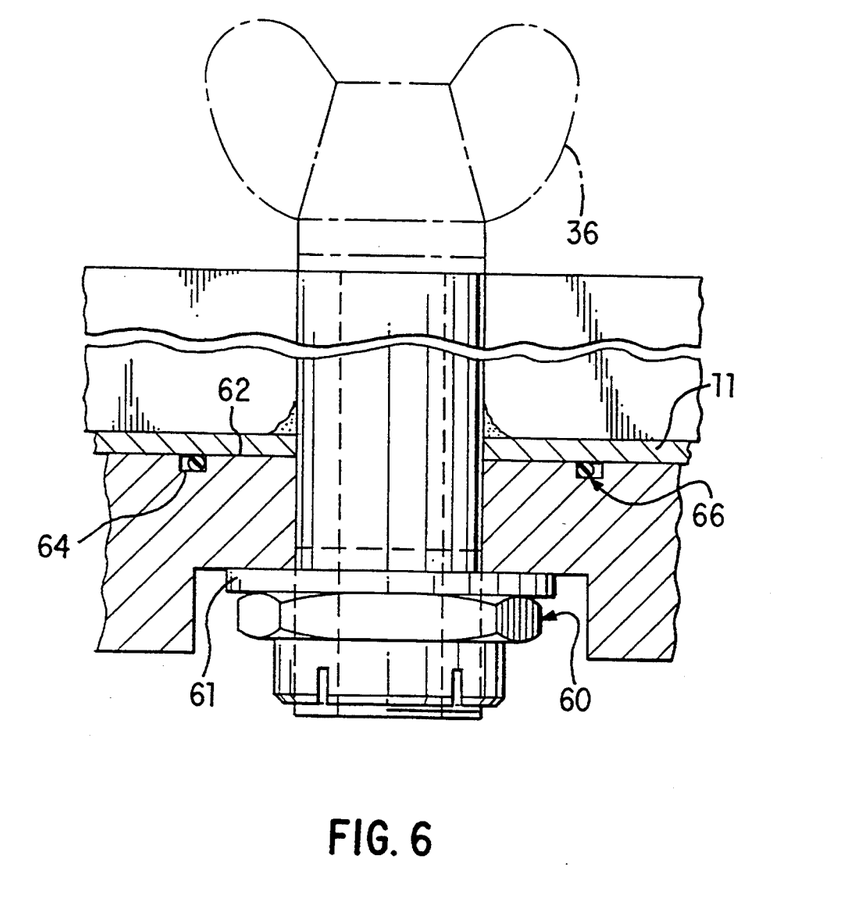
FIG. 6 is an enlarged view of the central portion of the collar of FIG. 5.

Referring to FIGS. 4 and 5, a screw thread 58 in a central bore 56 and a nut 60 are used to secure the collar section 6 to the cylindrical section 4 of the mandrel 2. The central portion of a collar 6, and in particular the central bore 56, are shown in enlarged form in FIG. 6. FIG. 6 shows a means for preventing compressed air from escaping from the end space 40 through the bore 56. A surface 62 parallel to the end plate 11 is formed with an annular trench 64 in which an O-ring 66 is seated. The O-ring seals any gap between the surface 62 and the immediately opposing surface of the end plate 11.

Figure 7:
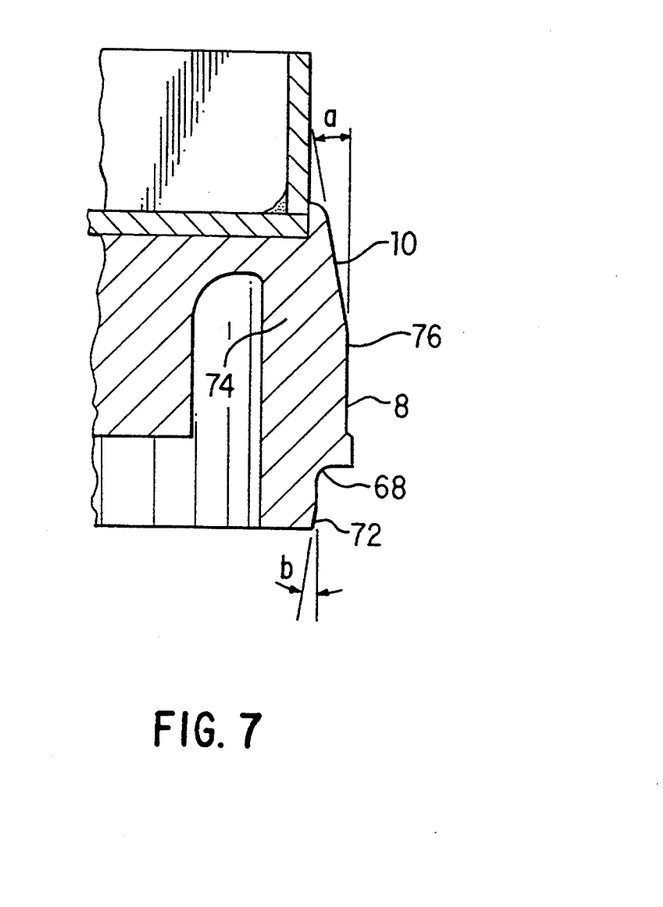
FIG. 7 is an enlarged view of an edge portion of the collar shown circled in FIG. 5.

FIG. 7 shows the portion of the collar section 6 circled in FIG. 5 in enlarged form. The conically tapered portion 10 has an angle of taper A which, in a preferred embodiment is 10°. A preferred range for the angle is from 0° to 10°, but can include suitably higher degrees of taper. The portion 8 of the collar section 6 has a substantially uniform cylindrical cross-section ending in a shoulder 68. The shoulder 68 engages the circum-ferential edge 70 (see FIG. 3) of the cylindrical section 4 during assembly of the mandrel 2. The shoulder 68 also has a conically tapered portion 72 to facilitate engaging of the shoulder 68 with the edge 70. The angle of taper B is preferably 10°, but can have any other suitable value. During mounting or removal of the belt 16, compressed air in the space 40 is forced out through the pores 12 in the wall 74 of the collar section 6. The air escaping from the outer surface 76 forms an air bearing for the belt 16.

An example of the air flotation system uses perforated Nylon 6/6 as the belt carrier. The carrier has a 13.37 inch outside diameter (33.96 cm), a 13.00 inch inside diameter (33.02 cm), and a 15.4 inch length (39.12 cm).

Laser drilled holes having a 0.007 inch diameter (178 μm) are spaced around the circumference of the cylinder at ¾ inch (19.05 mm) intervals, with the circumferential rows separated by ¾ inch (19.05 mm). The holes in alternate circumferential rows are staggered by 0.375 inches (9.53 mm). If the porous mandrel is formed by a sintering process, the pore density ranges may be substantially higher.

The belt mounting collar is 2½ inches (6.35 centimeters) long, with a 10° taper. The untapered end has a small lip machined to locate it in the main belt support mandrel. Rows of holes are formed in the collar space circumferentially at ¾ inch apart (19.05 mm), with the circumferential rows separated by 0.125 inch (3.18 millimeters). The collar also has its own air supply. The main mandrel is divided in two halves by expandable rubber seals.

In order to mount the substrate on the coating support mandrel, the mounting collar and the mandrel are pressurized to 10 psi (68.97 kPa). The substrate is then easily slipped over the collar and onto the support mandrel. Once the substrate is on the mandrel, the air pressure is removed. The substrate relapses onto the mandrel. The mandrel is then removed from the air supply system, and mounted on a coating mandrel for spray coating.

The mounting system is effective for mounting flexible 4 mil (102 μm) thick polyester belts of the same diameter as the support mandrel and also belts of slightly smaller diameter than the mandrel, e.g., 1065 millimeter belts mounted on a 1068 millimeter mandrel.

The mandrel preferably has a coefficient of thermal expansion equal to or less than that of the substrate if multiple coating and heating steps are required. When wall blow-molding polywoven belts of approximately 1068 mm×4 mm in diameter mounted on electroformed nickel cylinders, good thermal contact is maintained during multiple heating and cooling cycles between temperatures of 20° and 135° C.

What is claimed is:

1. A process for treating a seamless substrate to fabricate an electrostatographic imaging member comprising:
    elastically stretching said substrate over a hollow cylindrical porous mandrel having a thermal expansion coefficient not greater than the thermal expansion coefficient of the substrate by applying fluid under pressure through said mandrel;
    relieving the pressure of said fluid so that the substrate relapses to a shape in close contact with said mandrel; and
    treating said substrate in contact with the mandrel by an electrostatographic imaging member fabricating process to form an electrostatographic imaging member.

2. The process of claim 1, wherein said stretching further comprises sequentially forcing pressurized fluid though selected portions of said mandrel.

3. The process of claim 1, further comprising removing said substrate from said mandrel by expanding said substrate.

4. The process of claim 1, wherein said fluid is selected from air, oxygen and nitrogen.

5. The process of claim 1, further comprising manipulating the temperature of said fluid to control the temperature of said substrate.

6. The process of claim 1, further comprising removing said substrate from said mandrel by elastically restretching said substrate by applying fluid under pressure through said mandrel.

7. The process of claim 6, wherein said restretching comprises sequentially forcing pressurized fluid though selected portions of said mandrel.

8. A process for treating a seamless substrate according to claim 1 further comprising:
    removing said substrate from said mandrel by elastically stretching said substrate by applying fluid under pressure through said mandrel.

9. The process of claim 8, wherein said stretching comprises sequentially forcing pressurized heated fluid though selected portions of said mandrel.

10. The process of claim 8, wherein said fluid is selected from air, oxygen and nitrogen.

11. The process of claim 8, further comprising manipulating the temperature of said fluid to control the temperature of said substrate.

* * * * *